(12) United States Patent
Roberge et al.

(10) Patent No.: US 9,094,213 B2
(45) Date of Patent: Jul. 28, 2015

(54) METHOD AND SYSTEM FOR EFFECTING SECURE COMMUNICATION OVER A NETWORK

(75) Inventors: Pierre Antoine Roberge, Toronto (CA); Patrick Hans Engel, Richmond Hill (CA); Gregory Howard Wolfond, Toronto (CA)

(73) Assignee: SECUREKEY TECHNOLOGIES INC., Toronto (CA)

( * ) Notice: Subject to any disclaimer, the term of this patent is extended or adjusted under 35 U.S.C. 154(b) by 384 days.

(21) Appl. No.: 12/739,225

(22) PCT Filed: Oct. 24, 2008

(86) PCT No.: PCT/CA2008/001886
§ 371 (c)(1),
(2), (4) Date: Apr. 22, 2010

(87) PCT Pub. No.: WO2009/052634
PCT Pub. Date: Apr. 30, 2009

(65) Prior Publication Data
US 2010/0318801 A1 Dec. 16, 2010

Related U.S. Application Data

(60) Provisional application No. 60/982,344, filed on Oct. 24, 2007, provisional application No. 61/012,247, filed on Dec. 7, 2007.

(51) Int. Cl.
*H04L 29/06* (2006.01)
*H04L 9/32* (2006.01)

(52) U.S. Cl.
CPC ............ *H04L 9/3247* (2013.01); *H04L 9/3234* (2013.01); *H04L 9/3236* (2013.01);
(Continued)

(58) Field of Classification Search
CPC .. H04L 9/3247; H04L 63/0869; H04L 9/3234
USPC ........................................................ 713/172
See application file for complete search history.

(56) References Cited

U.S. PATENT DOCUMENTS 5,421,006 A 5/1995 Jablon et al.
5,949,882 A * 9/1999 Angelo .................. 713/185
(Continued)

FOREIGN PATENT DOCUMENTS

AU 2008316230 4/2009
CA 2 464 797 10/2004
(Continued)

OTHER PUBLICATIONS

Document relating to EP Application No. 2206275, dated Jul. 12, 2010 (Amendment).
(Continued)

*Primary Examiner* — Mohammad W Reza
(74) *Attorney, Agent, or Firm* — Bereskin & Parr LLP/S.E.N.C.R.L., s.r.l.

(57) ABSTRACT

A method of effecting secure communication over a network begins by interfacing a hardware token with a computer host. The hardware token includes security software and communication software stored thereon. The security software is stored in a memory of the hardware token. The computer host has a memory distinct from the hardware token memory. The authenticity of the security software is determined on the hardware token. Upon successful validation of the authenticity of the security software on the hardware token, the authenticity of the communication software is determined by loading the security software from the hardware token memory into the computer host memory and executing the loaded security software from the computer host memory. After successful validation of the authenticity of the communication software, the computer host facilitates communication between the hardware token and a remote computer by executing the communication software from the computer host memory.

18 Claims, 8 Drawing Sheets

(52) U.S. Cl.
CPC .......... *H04L63/083* (2013.01); *H04L 63/0853* (2013.01); *H04L 63/0869* (2013.01); *H04L 63/123* (2013.01); *H04L 2209/56* (2013.01); *H04L 2209/805* (2013.01)

(56) References Cited

U.S. PATENT DOCUMENTS

| | | | |
|---|---|---|---|
| 6,173,400 B1 * | 1/2001 | Perlman et al. | 713/172 |
| 7,111,321 B1 * | 9/2006 | Watts et al. | 726/2 |
| 7,213,766 B2 | 5/2007 | Ryan et al. | |
| 7,239,226 B2 | 7/2007 | Berardi et al. | |
| 7,752,445 B2 * | 7/2010 | Satoh | 713/173 |
| 8,307,413 B2 * | 11/2012 | Smadja et al. | 726/9 |
| 2004/0065728 A1 * | 4/2004 | Tournier | 235/375 |
| 2005/0074122 A1 * | 4/2005 | Fascenda | 380/258 |
| 2006/0032905 A1 * | 2/2006 | Bear et al. | 235/380 |
| 2006/0047604 A1 * | 3/2006 | Kraft-Oz et al. | 705/59 |
| 2007/0061897 A1 | 3/2007 | Holtzman et al. | |
| 2007/0150419 A1 | 6/2007 | Kozlay | |
| 2007/0179896 A1 * | 8/2007 | Elteto et al. | 705/57 |
| 2008/0152140 A1 * | 6/2008 | Fascenda | 380/258 |
| 2008/0270791 A1 * | 10/2008 | Nystrom et al. | 713/159 |
| 2009/0228966 A1 * | 9/2009 | Parfene et al. | 726/7 |

FOREIGN PATENT DOCUMENTS

| | | |
|---|---|---|
| CA | 2464797 | 10/2004 |
| CA | 2703628 | 4/2009 |
| EP | 1936530 A2 * | 6/2008 |
| EP | 2206275 | 7/2010 |
| WO | 2004109610 | 12/2004 |
| WO | WO 2004/109481 | 12/2004 |
| WO | WO 2004/109610 | 12/2004 |
| WO | 2005117527 | 12/2005 |
| WO | WO 2005/117527 | 12/2005 |
| WO | WO 2007110725 A1 * | 10/2007 |
| WO | 2009052634 A1 | 4/2009 |

OTHER PUBLICATIONS

Document relating to AU Application No. 2008316230, dated Aug. 6, 2012 (Examination Report).

Document relating to PCT Application No. PCT/CA2008/001886, dated Apr. 27, 2010 (IPRP).

Document relating to PCT Application No. PCT/CA2008/001886, dated Apr. 6, 2009 (ISR).

Document relating to EP Application No. 2206275, dated Jul. 29, 2014 (Search Report).

Document relating to EP Application No. 2206275, dated Aug. 18, 2014 (EPO Communication).

Document relating to EP Application No. 08842506.1, dated Feb. 26, 2015 (Response).

* cited by examiner

METHOD AND SYSTEM FOR EFFECTING SECURE COMMUNICATION OVER A NETWORK

This application is a National Stage Application of PCT/CA2008/001886, filed 24 Oct. 2008, which claims benefit of U.S. Provisional Ser. No. 60/982,344, filed 24 Oct. 2007, and U.S. Provisional Ser. No. 61/012,247, filed 7 Dec. 2007 and which applications are incorporated herein by reference. To the extent appropriate, a claim of priority is made to each of the above disclosed applications.

FIELD

This patent application generally relates to data processing systems, and relates, in particular, to a method and apparatus for performing data communications over a network using an intelligent cryptographic token.

BACKGROUND

While the emergence of the internet and other wide area network technologies have fostered the deployment of computer servers for conducting sensitive transactions, such as e-commerce transactions, the anonymous nature of such transactions has, in turn, fostered the growth of fraudulent activities aimed at the collection and subsequent use of confidential information for financial gain. While cryptographic protocols and algorithms have been developed to impede such fraudulent activities, to-date no single software solution has been able to ensure that financial information will not be used for fraudulent purposes.

Hardware-based solutions have been developed to limit the unauthorized use of confidential financial information during an e-commerce transaction. For example, Berardi (U.S. Pat. No. 7,239,226) describes a point-of-sale (POS) transaction system that includes a contactless fob, a POS device, and a RFID reader that is coupled to the POS device. The fob and the RFID reader store encryption keys. The fob also stores the user's financial account information. A consumer initiating an on-line transaction presents the assigned fob to the RFID reader, which causes the fob and the RFID reader to attempt wireless mutual authentication of each other. If mutual authentication is successful, the fob transmits the consumer's account information to the RFID reader. The RFID reader transmits the account information to the POS device if the RFID reader is able to authenticate a PIN that the user enters at a keypad attached to the RFID reader.

Kozlay (US 2007/15041.9) describes a dongle-based payment system. The dongle includes a fingerprint sensor, and secure memory that stores encryption keys. The customer initiates an e-commerce transaction by accessing a merchant website from a host computer, interfacing the dongle with the host computer, and pressing his/her finger against the fingerprint sensor. If the dongle is able to validate the customer's fingerprint, the dangle and the merchant website attempt mutual authentication of each other via an application service provider (ASP). If mutual authentication is successful, the ASP authorizes the merchant website to proceed with the transaction.

Since these hardware-based solutions require both a hardware device and personal information (e.g. PIN, fingerprint) to complete the transaction, these solutions also provide some assurance as to the identity of the consumer and that the consumer's financial account information has not been fraudulently obtained. However, these solutions only provide limited assurance that the consumer's financial account information will only be transmitted to trusted devices.

SUMMARY

According to one aspect of this disclosure, there is provided a method of effecting secure communication over a network. The method begins by interfacing a hardware token with a computer host. The hardware token comprises security software and communication software stored thereon. The security software is stored in a memory of the hardware token. The computer host comprises a memory distinct from the hardware token memory. The authenticity of the security software is determined on the hardware token. Upon successful validation of the authenticity of the security software on the hardware token, the authenticity of the communication software is determined by loading the security software from the hardware token memory into the computer host memory and executing the loaded security software from the computer host memory. After successful validation of the authenticity of the communication software, the computer host facilitates communication between the hardware token and a remote computer by executing the communication software from the computer host memory.

According to another aspect of this disclosure, there is provided a hardware token that comprises an interface, and memory that is coupled to the interface. The interface is configured to interface the hardware token with a computer host. The memory stores communication software and security software. The communication software is configured to facilitate communication between the hardware token and a computer server via the computer host. The security software is configured to determine the authenticity of the security software and the authenticity of the communication software, and to load the communication software into the computer host for execution thereon after successful validation of the authenticity of the security software and the communication software.

In one implementation, the memory comprises a passcode stored thereon, and the security software is configured to prompt for entry of a passcode at the hardware token, determine the validity of the entered passcode at the hardware token by comparing the entered passcode against the stored passcode, and then load the communication software into the computer host after successful validation of the entered passcode and the authenticity of the communication software. The security software may be configured to cause the computer host to download a reference copy of the communication software from a software update computer to the memory upon unsuccessful validation of the authenticity of the communication software.

In one implementation, the hardware token memory stores a hash code comprising a one-way hash of the security software, and the security software is configured to determine the authenticity of the security software by causing the hardware token to compute a one-way hash of the security software and compare the computed one-way hash against the stored hash code. The hardware token memory may also store a second hash code comprising a one-way hash of the communication software, and the security software may be configured to determine the authenticity of the communication software by causing the computer host to compute a one-way hash of the communication software and compare the computed communication software hash against the second hash code.

In one implementation, the hardware token memory comprises a read-only memory and a read-write memory, and the security software comprises an integrity check procedure and an application loader procedure. The integrity check procedure is stored in the read-only memory and is configured to determine the authenticity of the application loader procedure. The application loader procedure is configured to determine the authenticity of the communication software. The hardware token memory may also comprise a hash code comprising a one-way hash of the integrity check procedure, and the integrity check procedure may be configured to compute a one-way hash of the loader program and to effect loading of the application loader procedure into the computer host memory after a match between the computed one-way hash and the stored hash code.

The hardware token memory may also comprise a second hash code comprising a one-way hash of the communication software. The communication software may be stored in the read-write memory, and the application loader procedure may be configured to compute a one-way hash of the communication software and load the communication software into the computer host memory after a match between the communication software hash and the second hash code.

In one implementation, the hardware token comprises a wireless card reader coupled to the interface and configured for communication with a RFID device. The interface may be configured for removably interfacing the hardware token with the computer host. The hardware token may also comprise a data port coupled to the interface and configured for communication with a keyboard device.

In one implementation, the method of effecting secure communication also comprises at the hardware token verifying an identity of the remote computer by receiving a digital signature purporting to be signed by the remote computer and determining whether the received digital signature was signed by the remote computer.

In other implementation, the method of effecting secure communication further comprises interfacing a Smartcard with the hardware token, and at the Smartcard verifying an identity of the remote computer and the hardware token by receiving at the Smartcard digital signatures each purporting to be signed respectively by the remote computer and the hardware token and determining whether each received respective digital signature was signed by the remote computer and the hardware token.

In other implementation, the method of effecting secure communication further comprises interfacing a Smartcard with the hardware token, and at the hardware token verifying an identity of the remote computer of behalf of the smartcard by receiving at the hardware token a digital signature purporting to be produced by the remote computer and determining whether the received digital signature was produced by the remote computer.

According to another aspect of this disclosure, there is provided a method of effecting a transaction over a network. The method begins by interfacing a hardware token with a computer host, and interfacing a Smartcard with the hardware token. The computer host is in communication with a computer server over the network. The hardware token, the Smartcard and the computer server are all participants to the transaction.

At each transaction participant, the identity of each other participant is verified by receiving at each transaction participant digital signatures each purporting to be signed by a respective one of the other transaction participants, and determining whether each digital signature received at each transaction participant was signed by the respective other participant. The transaction is proceeded with in accordance with an outcome of the identity verifications.

In one implementation, the digital signature verifying comprises at the hardware token generating a digital signature and transmitting the token-signed digital signature to the Smartcard after successful validation of the digital signature purporting to be signed by the computer server. In other implementation, the digital signature verifying further comprises at the Smartcard generating a digital signature and transmitting the Smartcard-signed digital signature to the hardware token after successful validation of the token-signed digital signature.

In other implementation, the digital signature verifying further comprises the hardware token producing a digital signature on behalf of the Smartcard and transmitting the Smartcard digital signature to the computer server after successful validation of the Smartcard digital signature.

BRIEF DESCRIPTION OF THE DRAWINGS

One or more embodiments of the foregoing will now be described, by way of example only, with reference to the accompanying drawings, in which.

DETAILED DESCRIPTION

Data Processing System

Figure 1:
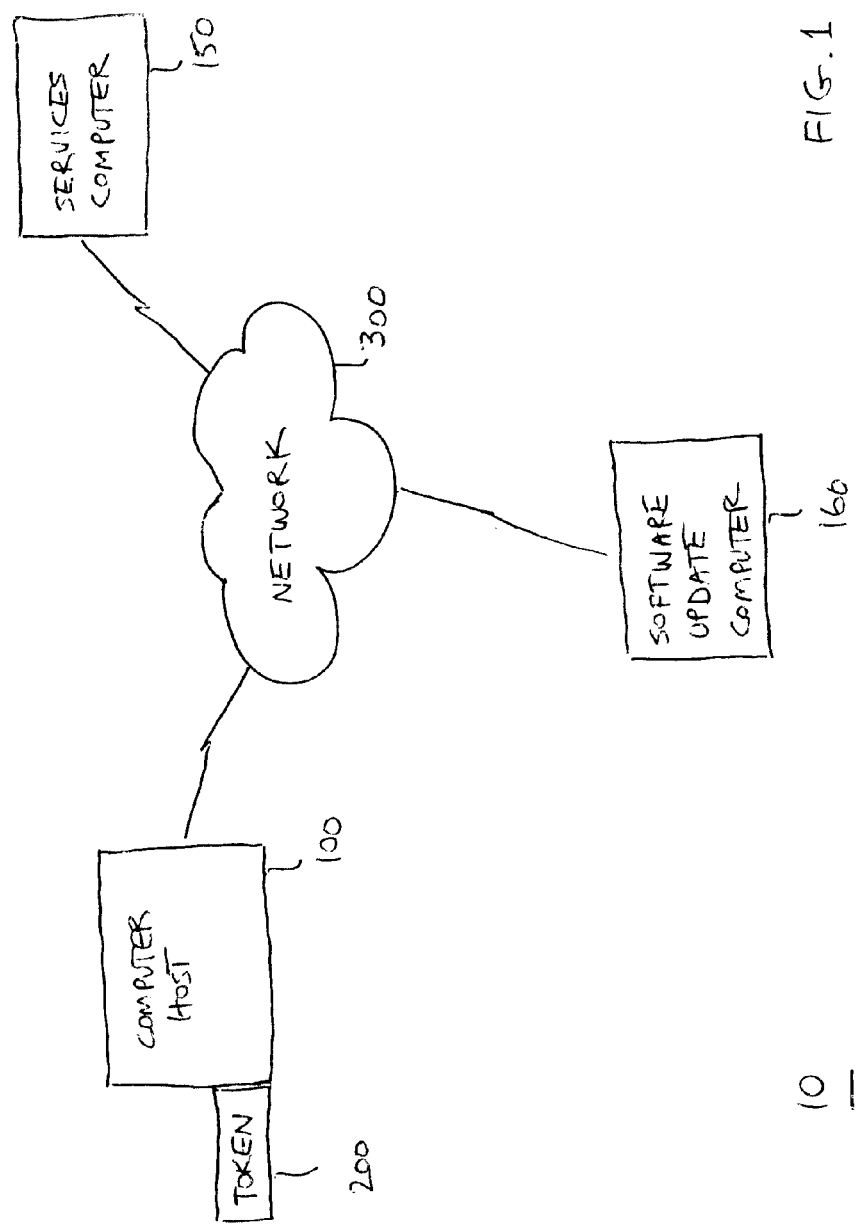
FIG. 1 is a schematic view of one example embodiment of a data processing system, depicting a computer host and a hardware token interfaced with the computer host.

Turning to FIG. 1, a data processing system 10 is shown comprising a computer host 100, one or more services computers 150, a software update computer 160, a hardware token 200, and a communications network 300 interconnecting the computer host 100, the services computers 150 and the software update computer 160. The communications network 300 typically comprises a wide area network, such as the internet. However, the communications network 300 is not limited to any particular network topology.

Computer Host

Figure 2:
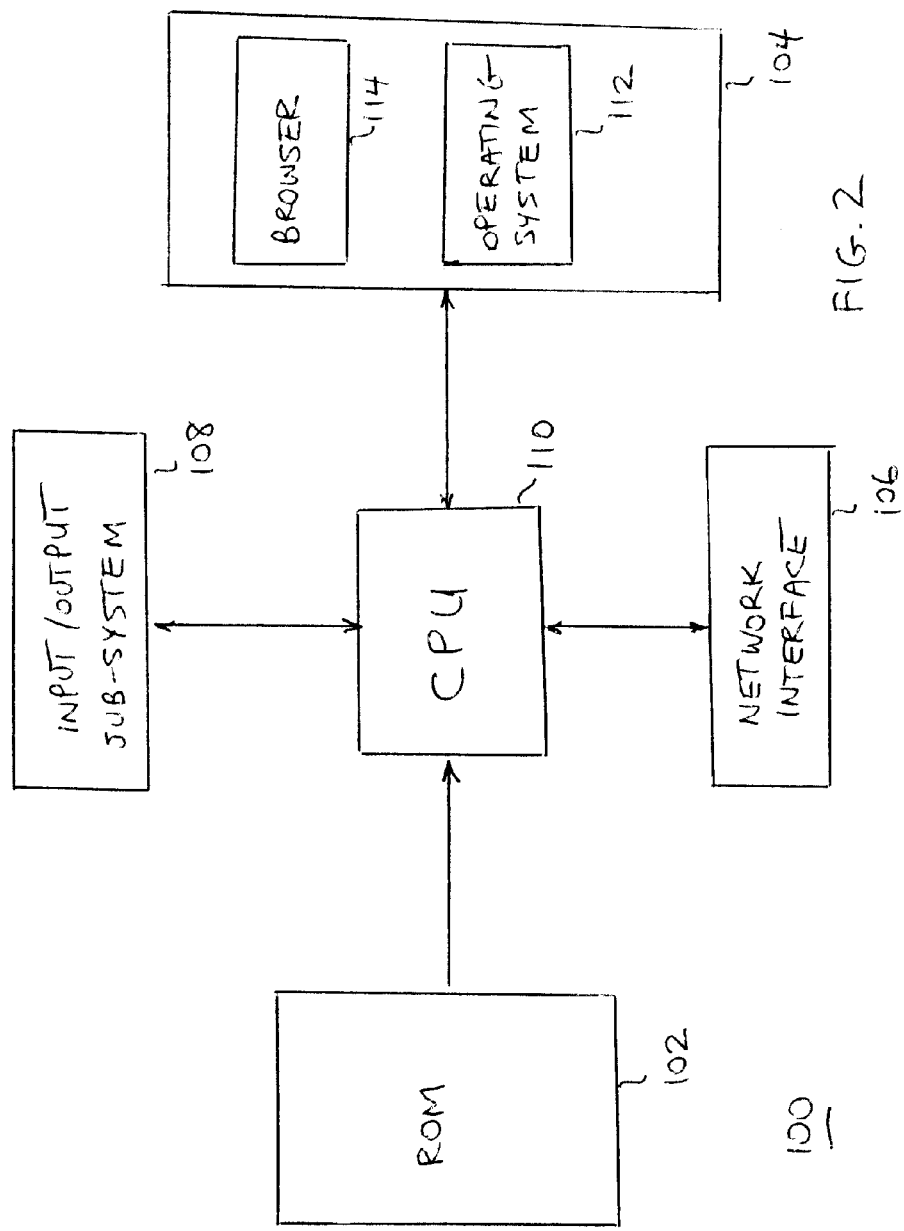
FIG. 2 is a schematic view of the computer host of FIG. 1.

As shown in FIG. 2, the computer host 100 is configured as a conventional networked computer, and comprises a non-volatile memory (ROM) 102, a main volatile memory (RAM) 104, a network interface 106, an input/output (I/O) sub-system 108, and a microprocessor (CPU) 110 in communication with the ROM 102, the RAM 104, the network interface 106 and the I/O sub-system 108. The network interface 106 physically interfaces the computer host 100 with the communications network 300.

The I/O sub-system 108 comprises at least one data output port, and at least one data input port. The computer host 100 may include a display device that is connected to one of the data output ports. Further, typically the hardware token 200 is interfaced with the computer host 100 via one of the data input ports, and a data input device (such as a keyboard) is interfaced with the hardware token 200. Alternately, the keyboard may be interfaced with the computer host 100 via one of the data input ports.

As shown, the ROM 102 carries computer processing instructions for the computer host 100 which, when loaded into the RAM 104 and executed by the CPU 110, define an operating system 112, and one or more general-purpose computer programs 114. The operating system 112 controls the overall operation of the computer host 100, and allows the computer host 100 to communicate with the devices that are interfaced with the I/O subsystem 108 and with other devices over the communications network 300. One of the general-purpose computer programs 114 may comprise a web browser 114.

Each services computer 150 is a networked computer server that provides online services to the computer host 100. Preferably, the data processing system 10 is configured as an e-commerce transaction system, and at least one of the services servers 150 is configured to provide financial or e-commerce transaction services for the user of the computer host 100. However, the services computers 150 are not limited to any particular service. Further, typically the services computers 150 are configured as web servers that respond to requests for web pages from the computer host 100. However, the services computers 150 are not limited to any particular architecture. For instance, any of the services computers 150 may be configured as a FTP server, a Unix server, or other environment where credential authentication is required.

The software update computer 160 is also a networked computer server. As will be explained, to ensure that the computer programs that are stored in the unprotected memory of the hardware token 200 are up to date, and have not been modified by a third party for the purpose of fraudulent activity, the software update computer 160 stores reference copies of the computer programs for updating or correcting the computer programs that are stored in the unprotected memory of the hardware token 200. Further, the software update computer 160 stores a status identifier for each hardware token 200, indicating the current status thereof. Possible token status identifiers include active, expired, and disabled.

Hardware Token

Figure 3:
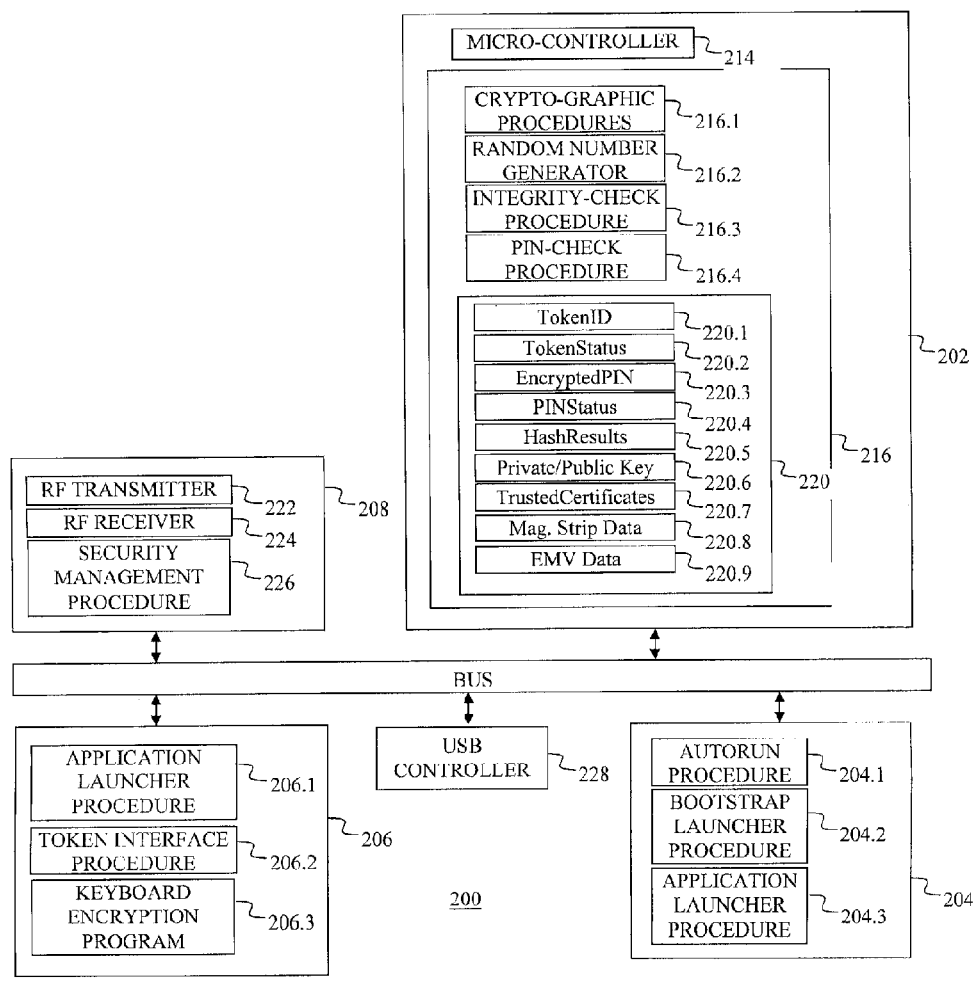
FIG. 3 is a schematic view of the hardware token of FIG. 1.

The hardware token 200 is typically packaged as a key-fob, and comprises a portable self-contained Smartcard-based electronic device. As shown in FIG. 3, the hardware token 200 comprises a data processor section 202, a read-only memory 204, a read-write memory 206, a RFID reader 208, and a USB sub-system, all interconnected by a common system bus.

Data Processor Section

The data processor section 202 comprises a micro-controller 214, and a protected memory 216 that is accessible only to the micro-controller 214.

The protected memory 216 may comprise computer processing instructions for the micro-controller 214 which, when executed by the micro-controller 214 define one or more cryptographic procedures 216.1, a random-number generator 216.2, an IntegrityCheck procedure 2163, and a PIN-check procedure 216.4.

The protected memory 216 may also comprise a plurality of records database 220 that are accessible to the micro-controller 214. Preferably, the database 220 comprises a TokenID record 220.1, a TokenStatus record 2202, an EncryptedPIN record 220.3, a PIN status record 220.4, one or more HashResult records 220.5, a Private/Public Key record 220.6, and one or more TrustedCertificate records 220.7.

As will become apparent below, the data processor section 202 uses the cryptographic procedures 216.1 to perform cryptographic functions, such as digital signature creation and verification. The data processor section 202 uses the random-number generator 216.2 to generate pseudo-random numbers for mutual authentication with the computer host 100. The data processor section 202 uses the IntegrityCheck procedure 216.3 to verify the integrity of various computer programs that are stored on the hardware token 200. The data processor section 202 uses the PIN-check procedure 216.4 to determine the validity of a passcode (e.g. personal identification number (PIN) or password) that is entered at the computer host 100.

The TokenID record 220.1 contains a serial number that is uniquely associated with the hardware token 200. The TokenStatus record 220.2 identifies the status of the hardware token 200. Possible token status identifiers include active, expired, and disabled. The EncryptedPIN record 220.3 stores an encrypted version of the user's passcode. The PIN status record 220.4 stores the outcome of the PIN-check algorithm. Possible PIN status identifiers include null, incorrect, passed, and locked. The HashResult records 220.5 stores one-way hashes (SHA1 digests) of various computer programs that are stored on the hardware token 200. The Private/PublicKey records 220.6 identify the user's digital certificates (stored in x.509 format). The TrustedCertificate records 220.7 identify the third-party digital certificates that are trusted by the hardware token 200.

The database 220 may also comprise magnetic stripe data 220.8 that includes the data elements required to emulate a magnetic-stripe debit/credit card-based transaction, and EMV data 220.9 that includes the data elements required to implement a payment using the EMV standard.

Read-Only Memory

The read-only memory 204 stores security software, for execution by the computer host 100, that cannot be securely updated from the software update computer 160 without increasing the likelihood that third parties could re-configure the computer host 100 or the hardware token 200 to engage in fraudulent activity. The security software may comprise an Autorun procedure 204.1, a BootstrapLauncher procedure 204.2, and an ApplicationLauncher procedure 204.3. Prior to issuance of the hardware token 200 to the user thereof, one of the HashResult records 220.5 of the protected memory 216 is populated by the token issuer with the SHA1 hash value of the ApplicationLauncher procedure 204.3.

Execution of the Autorun procedure 204.1 causes the computer host 100 to load the BootstrapLauncher procedure 204.2 into the main memory 104 of the computer host 100, and to initiate execution of the BootstrapLauncher procedure 204.2. As will be explained below, the read-write memory 206 stores an ApplicationLauncher procedure 206.1, which is a copy of the ApplicationLauncher procedure 204.2. Execution of the BootstrapLauncher procedure 204.2 causes the data processor section 202 of the hardware token 200 to verify the integrity of the ApplicationLauncher procedure 206.1, and causes the computer host 100 to initiate execution of the verified ApplicationLauncher procedure 206.1 from the main memory 104 of the computer host 100. The BootstrapLauncher procedure 204.2 uses the ApplicationLauncher procedure 204.3 (stored in the read-only memory 204) to update/correct the ApplicationLauncher procedure 206.1 when validation thereof fails.

Read-Write Memory

The read-write memory 206 stores various computer programs, for execution by the computer host 100, that can be securely updated from the software update computer 160 without increasing the likelihood that third parties could reconfigure the hardware token 200 to engage in fraudulent activity. As discussed above, one of these computer programs may comprise the ApplicationLauncher procedure 206.1. Other computer programs that may be stored in the read-write memory 206 may comprise a TokenInterface procedure 206.2, and a keyboard encryption program 206.3.

Execution of the ApplicationLauncher procedure 206.1 causes the computer host 100 to verify the integrity of various computer programs that are stored in the read-write memory 206. Execution of the TokenInterface procedure 206.2 allows the computer host 100 to facilitate communication between the hardware token 200 and the services computers 150, and between the hardware token 200 and the software update computer 160. The TokenInterface procedure 206.2 may be implemented as a special-purpose web browser, a web browser plug-in or extension, a terminal emulator, device driver, stand-alone application, or other software layer that interfaces with a software program that is installed on the computer host 100.

Execution of the keyboard encryption program 206.3 allows the computer host 100 to facilitate encrypted communication between the keyboard (interfaced with the hardware token 200) and the computer host 100, and between the keyboard and the services computers 150. The computer program that communicates with the keyboard encryption program 206.3 (e.g. on the services computer 150) is responsible for decrypting the encrypted keyboard input received from the keyboard encryption program 206.3.

RFID Reader

The RFID reader 208 comprises a RF transmitter 222, a RF receiver 224, RF antenna (not shown) and a security management procedure 226. The RF transmitter 222 and receiver 224 are respectively configured for transmitting and receiving RFID communications with external RFID devices (via the RF antenna) that are in proximity to the hardware token 200. The security management procedure 226 comprise a set of computer processing instructions, for execution by the microcontroller 214, that facilitates communication (via the RF transmitter 222 and receiver 224) between the external RFID devices and the hardware token 200.

Optionally, the data processor section 202 also comprises a contactless card interface (not shown) that is coupled to the RF antenna and causes the hardware token 200 to appear to an external contact-less card reader as a stand-alone Smartcard.

USB Sub-System

The USB Sub-system comprises one or more USB ports, and a USB controller 228 that controls data flow between the data processor section 202 and devices that may be connected to the USB ports. One of the USB ports may be used as an interface for removably connecting the hardware token 200 to the computer host 100. Further, as discussed above, the keyboard of the computer host 100 may be interfaced with the hardware token 200. In this variation, one of the USB ports may be used to connect the keyboard to the hardware token 200.

Method of Operation of Data Processing System

Figure 4:
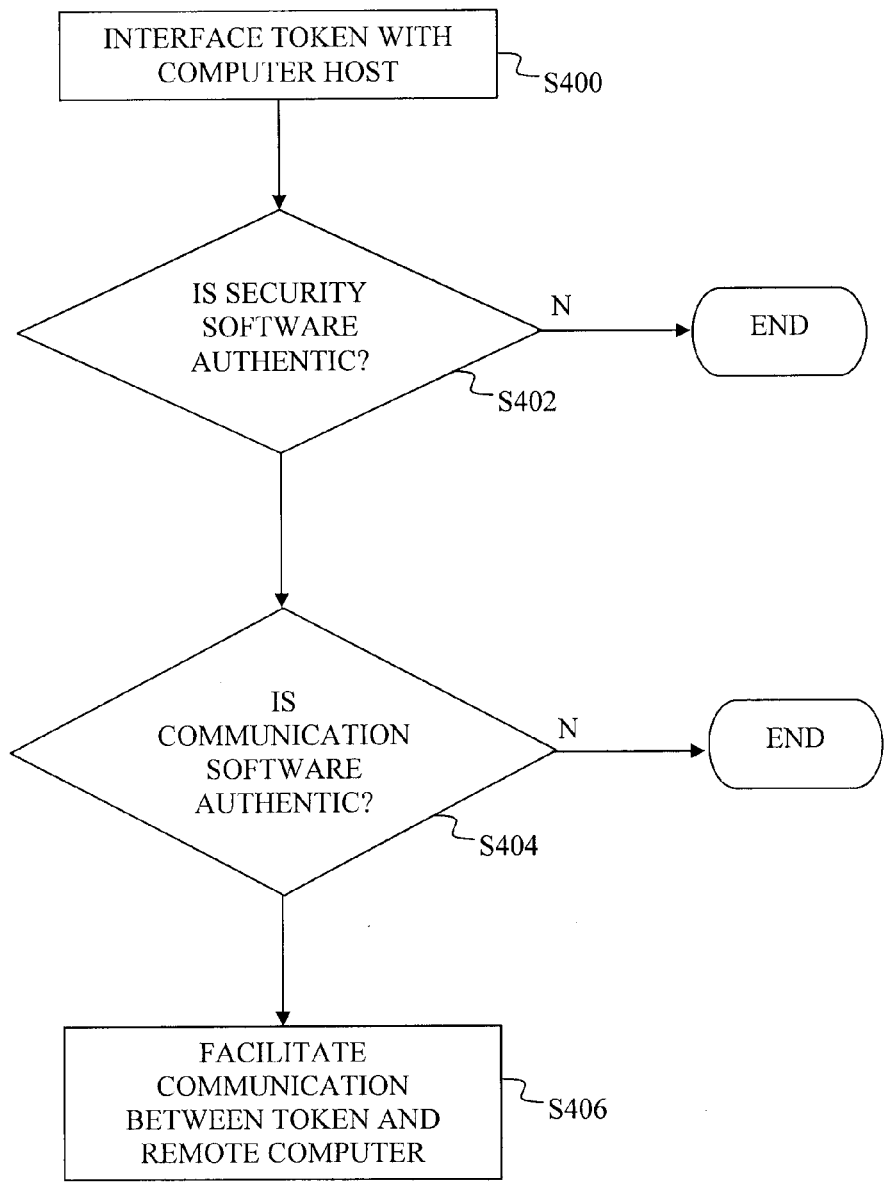
FIG. 4 is a flowchart depicting, by way of overview, the method of operation of the data processing system.

The method of operation of the data processing system 10 will now be discussed by way of overview, with reference to FIG. 4. At step S400, a hardware token is interfaced with a computer host. The hardware token comprises security software and communication software stored thereon. The security software is stored in a memory of the hardware token. The computer host comprises a memory that is distinct from the hardware token memory.

At step S402, the authenticity of the security software is determined on the hardware token. After successful validation of the authenticity of the security software on the hardware token, at step S404 the authenticity of the communication software is determined by loading the security software from the hardware token memory into the computer host memory and executing the loaded security software from the computer host memory.

After successful validation of the authenticity of the communication software, at step S406 the computer host facilitates communication between the hardware token and a remote computer by executing the communication software from the computer host memory.

Further details of the operation of the data processing system 10 will now be discussed with reference to FIGS. 5 to 8.

BootstrapLauncher Procedure

Figure 5:
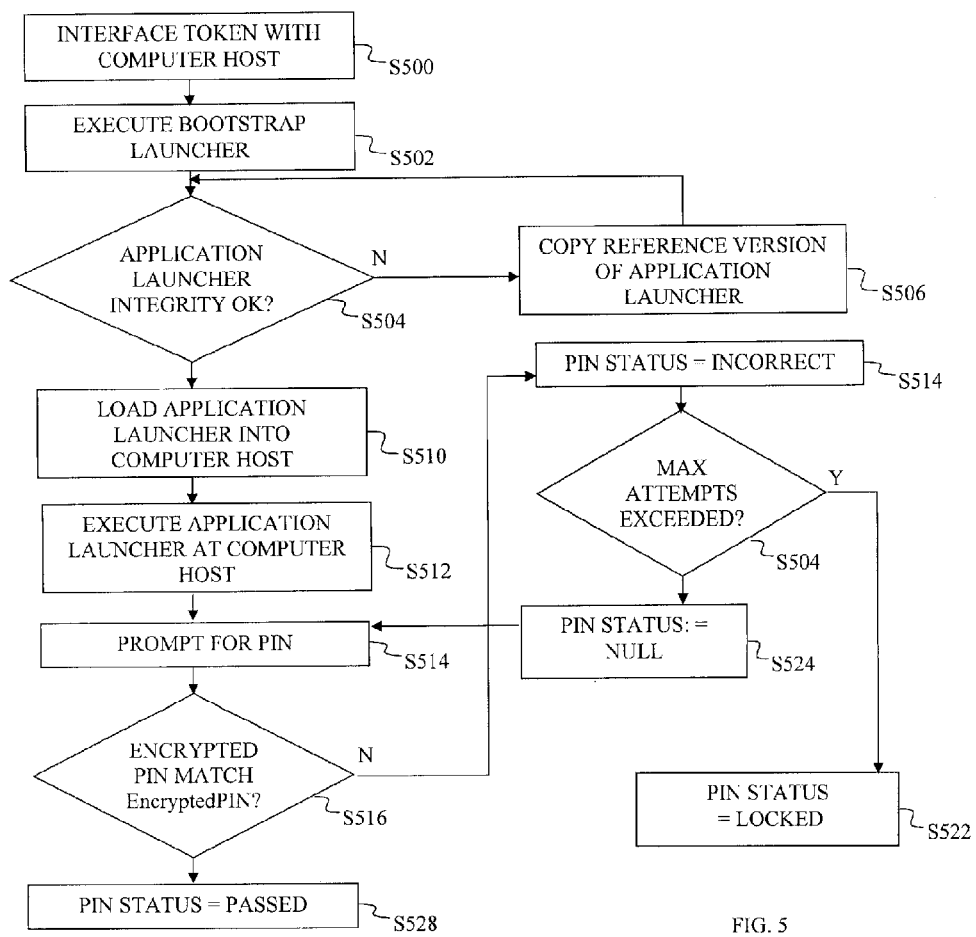
FIG. 5 is a flowchart depicting the method of operation of the BootstrapLauncher procedure implemented in the data processing system.

Turning to FIG. 5, at step S500 the hardware token 200 is interfaced with the computer host 100 by connecting the hardware token 200, via one of its USB ports, to a corresponding data input port of the computer host 100.

If the Autorun capabilities of the operating system 112 have been enabled, the operating system 112 of the computer host 100 loads the Autorun procedure 204.1 into the main memory 104 of the computer host 100 from the read-only memory 204 of the hardware token 200. The computer host 100 then begins execution of the Autorun procedure 204.1 in the main memory 104 which causes the computer host 100 to load the BootstrapLauncher procedure 204.2 into the main memory 104 from the read-only memory 204.

At step S502, the Autorun procedure 204.1 causes the computer host 100 to begin execution of the BootstrapLauncher procedure 204.2 from the main memory 204. If the Autorun capabilities of the operating system 112 have not been enabled, the user of the computer host 100 can manually initiate execution of the BootstrapLauncher procedure 204.2 from the computer host 100 in the conventional manner.

At step S504, the BootstrapLauncher procedure 204.2 causes the data processor section 202 of the hardware token 200 to initiate execution of the IntegrityCheck procedure 216.3 from the protected memory 216 of the hardware token 200. The IntegrityCheck procedure 216.3 causes the hardware token 200 to verify the integrity of the ApplicationLauncher procedure 206.1 that is stored in the read-write memory 206 of the hardware token 200.

To verify the integrity of the ApplicationLauncher procedure 206.1, the IntegrityCheck procedure 216.3 causes the data processor section 202 to compute the SHA1 hash of the ApplicationLauncher procedure 206.1, and compare the computed SHA1 against the hash value of the ApplicationLauncher procedure 204.3 that is stored in the HashResult record 220.5 of the protected memory 216. If the computed hash value does not match the hash value that was stored in the HashResult record 220.5, processing continues at step S506. On the other hand, if the computed hash value matches the hash value that was stored in the HashResult record 220.5, processing continues at step S510.

At step S506, the BootstrapLauncher procedure 204.2 receives notification from the IntegrityCheck procedure 216.3 of the unsuccessful validation of the ApplicationLauncher procedure 206.1, and copies the ApplicationLauncher procedure 204.3 from the read-only memory 204 to the read-write memory 206, thereby overwriting the previous version of the ApplicationLauncher procedure 206.1 in the read-write memory 206. Processing then returns to step S504, where the data processor section 202 re-initiates execution of the IntegrityCheck procedure 216.3 to verify the integrity of the new copy of the ApplicationLauncher procedure 206.1 that is stored in the read-write memory 206 of the hardware token 200.

If the newly computed SHA1 hash value of the new copy of the ApplicationLauncher procedure 206.1 does not match the hash value that was stored in the HashResult record 220.5, an error condition is returned to the BootstrapLauncher procedure 204.2, and processing terminates. However, if the newly computed hash value matches the hash value that was stored in the HashResult record 220.5, processing continues at step S510.

At step S510, the BootstrapLauncher procedure 204.2 receives notification from the IntegrityCheck procedure 216.3 of the successful validation of the authenticity of the ApplicationLauncher procedure 206.1, and then loads the ApplicationLauncher procedure 206.1 into the main memory 104 of the computer host 100 from the read-write memory 206 of the hardware token 200. At step S512, the BootstrapLauncher procedure 204.2 then causes the computer host 100 to begin execution of the ApplicationLauncher procedure 206.1 from the main memory 104.

At step S514 (or contemporaneously with step S504), the BootstrapLauncher procedure 204.2 also causes the data processor section 202 of the hardware token 200 to initiate execution of the PIN-check procedure 216.4 from the protected memory 216 of the hardware token 200. The PIN-check procedure 216.4 causes the hardware token 200 to verify the validity of a user-entered passcode.

To verify the validity of a user-entered passcode, the PIN-check procedure 216.4 causes the computer host 100 to display a message prompting the user to enter a passcode via the keyboard. Alternately, the user may be prompted to present a contactless passkey (e.g. contactless Smartcard or RFID device) having a passcode stored thereon. At step S516, the PIN-check procedure 216.4 then causes the data processor section 202 of the hardware token 200 to compute an encrypted value from the received passcode, and compare the calculated encrypted value against the encrypted passcode that is stored in the EncryptedPIN record 220.3 of the protected memory 216. Preferably, the PIN-check procedure 216.4 uses the keyboard encryption program 206.3 to compute the encrypted value from the keyboard-entered passcode.

If the computed hash value does not match the hash value that was stored in the EncryptedPIN record 220.3, processing continues at step S518. On the other hand, if the computed hash value matches the hash value that was stored in the EncryptedPIN record 220.3, processing continues at step S528, where the PIN-check procedure 216.4 saves "passed" as the status identifier in the PIN status record 220.4.

At step S518, the PIN-check procedure 216.4 saves "incorrect" as the status identifier in the PIN status record 220.4, and then determines if the number of passcode input attempts has exceeded a maximum limit, at step S520. If the maximum number of passcode input attempts has been exceeded, at step S522 the PIN-check procedure 216.4 saves "locked" as the status identifier in the PIN status record 220.4. On the other hand, if the maximum number of passcode input attempts has not been exceeded, at step S524 the PIN-check procedure 216.4 clears the status identifier in the PIN status record 220.4. The PIN-Check procedure 216.4 then causes the computer host 100 to display a message prompting the user to re-enter a passcode via the keyboard or present another contactless passkey. Processing then continues at step S516.

ApplicationLauncher Procedure

Figure 6:
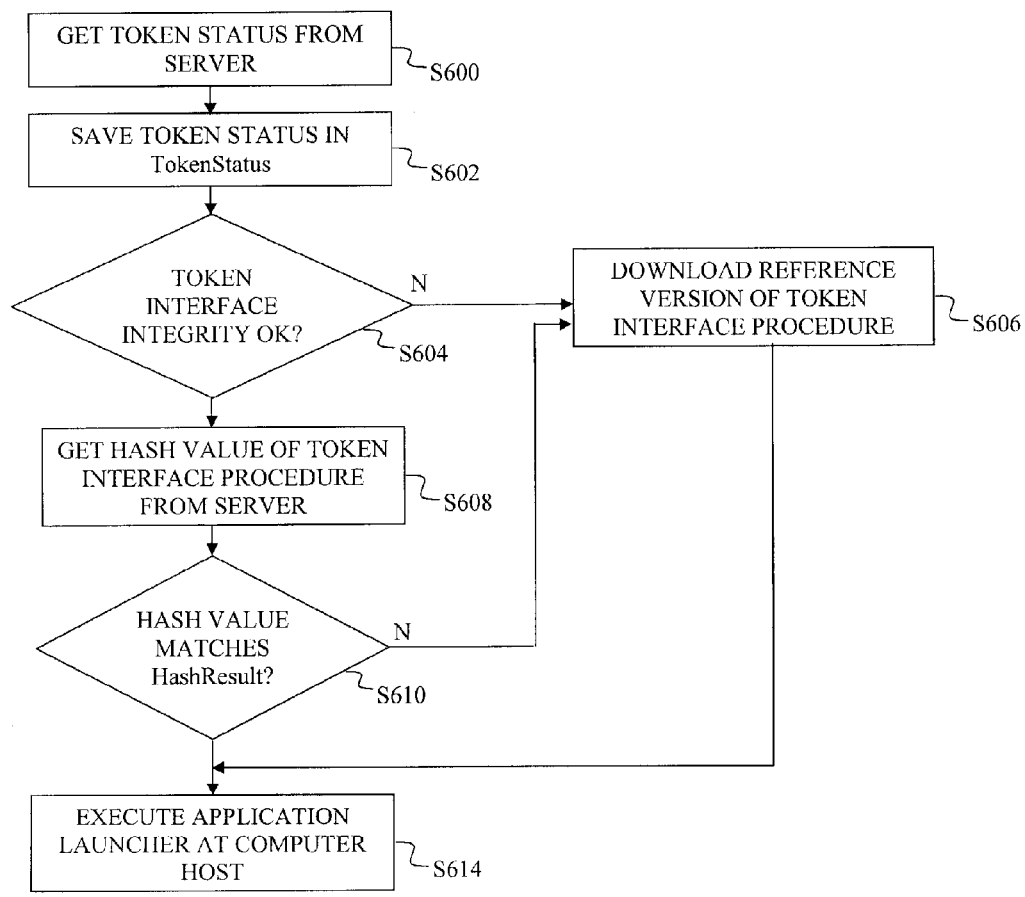
FIG. 6 is a flowchart depicting the method of operation of the ApplicationLauncher procedure implemented in the data processing system.

Turning to FIG. 6, at step S600 the ApplicationLauncher procedure 206.1 causes the computer host 100 to query the software update computer 160 with the TokenID record 220.1 for the current status of the associated hardware token 200. At step S602, the ApplicationLauncher procedure 206.1 causes the data processor section 202 of the hardware token 200 to save the returned status identifier in the TokenStatus record 220.2.

Processing terminates at step S602 if the returned status identifier indicates that the hardware token 200 is disabled (e.g. the hardware token 200 was stolen) or expired. However, if the returned status identifier indicates that the hardware token 200 is active, at step S604 the ApplicationLauncher procedure 206.1 causes the computer host 100 to verify the integrity of the TokenInterface procedure 206.2 and the keyboard encryption program 206.3, that are stored in the read-write memory 206 of the hardware token 200.

To verify the integrity of the TokenInterface procedure 206.2, the ApplicationLauncher procedure 206.1 causes the data processor section 202 of the hardware token 200 to initiate execution of the IntegrityCheck procedure 216.3 from the protected memory 216 of the hardware token 200. To verify the integrity of the TokenInterface procedure 206.2, the IntegrityCheck procedure 216.3 causes the data processor section 202 to compute the SHA1 hash of the TokenInterface procedure 206.2. Alternately, the ApplicationLauncher procedure 206.1 may cause the computer host 100 to compute the SHA1 hash of the TokenInterface procedure 206.2. The data processor section 202 then compares the computed SHA1 hash value against the hash value of the TokenInterface procedure 206.2 that is stored in the HashResult record 220.5 of the protected memory 216. If the computed hash value does not match the hash value that was stored in the HashResult record 220.5, processing continues at step S606. On the other hand, if the computed hash value matches the hash value that was stored in the HashResult record 220.5, processing continues at step S608.

At step S606, the ApplicationLauncher procedure 206.1 receives notification from the IntegrityCheck procedure 216.3 of the unsuccessful validation of the authenticity of the TokenInterface procedure 206.2, and then downloads the reference copy of the TokenInterface procedure 206.2 from the software update computer 160. The ApplicationLauncher procedure 204.3 copies the reference copy of the TokenInterface procedure 206.2 to the read-write memory 206 of the hardware token 200, thereby overwriting the invalid version of the TokenInterface procedure 206.2. Processing then continues at step S614.

At step S608, the ApplicationLauncher procedure 206.1 receives notification from the IntegrityCheck procedure 216.3 of the successful validation of the authenticity of the TokenInterface procedure 206.2, and then determines whether the software update computer 160 has any updates for the TokenInterface procedure 206.2 that is stored in the read-write memory 206 of the hardware token 200. To do so, the ApplicationLauncher procedure 206.1 queries the software update computer 160 with the TokenID record 220.1 for a SHA1 hash value, stored on the software update computer 160, that was computed from the reference copy of the TokenInterface procedure 206.2.

At step S610, the ApplicationLauncher procedure 206.1 causes the data processor section 202 to compare the returned SHA1 hash value against the hash value of the TokenInterface procedure 206.2 that is stored in the HashResult record 220.5 of the protected memory 216. If the returned hash value matches the hash value that was stored in the HashResult record 220.5, processing continues at step S614.

On the other hand, if the returned bash value does not match the hash value that was stored in the HashResult record 220.5, the ApplicationLauncher procedure 206.1 causes the computer host 100 to download the reference copy of the TokenInterface procedure 206.2 from the software update computer 160. The ApplicationLauncher procedure 204.3 copies the reference copy of the TokenInterface procedure 206.2 to the read-write memory 206 of the hardware token 200, thereby overwriting the previous version of the TokenInterface procedure 206.2. Processing then continues at step S614.

A similar procedure is performed with respect to the keyboard encryption program 206.3.

At step S614, the ApplicationLauncher procedure 204.3 loads the TokenInterface procedure 206.2 into the main memory 104 of the computer host 100 from the read-write memory 206 of the hardware token 200. If the status identifier saved in the PIN status record 220.4 is "passed", the ApplicationLauncher procedure 204.3 then initializes the TokenInterface procedure 206.2 for use by the computer best 100.

Online Transaction—Overview

An example online transaction using the computer host 100 and hardware token 200 will now be described with reference to FIGS. 7 and 8. To effect an online transaction between the computer host 100 and one of the services computers 150, the user of the computer host 100 may contact the services computer 150 by invoking a web browser, terminal emulator or other suitable communication program.

As discussed above, the TokenInterface procedure 206.2 may be configured as a special-purpose web browser, a web browser plug-in or extension, a terminal emulator, device driver, or other software layer that interfaces with communication software program that is installed on the computer host 100. Therefore, depending upon the configuration, the user of the computer host 100 may contact the services computer 150 by invoking a web browser or other communication program that communicates with the TokenInterface procedure 206.2, or by directly invoking the TokenInterface procedure 206.2.

Preferably, the services computer 150 then initiates two-way mutual authentication with the hardware token 200, via the computer host 100, so that the user of the computer host 100 and the operator of the services computer 150 can be assured of the identity of the other party. More preferably, the services computer 150 initiates three-way mutual authentication with the hardware token 200 and a payment card that is interfaced with the hardware token 200. Both forms of mutual authentication will be explained below.

Online Transaction Using Two-Way Authentication

Figure 7:
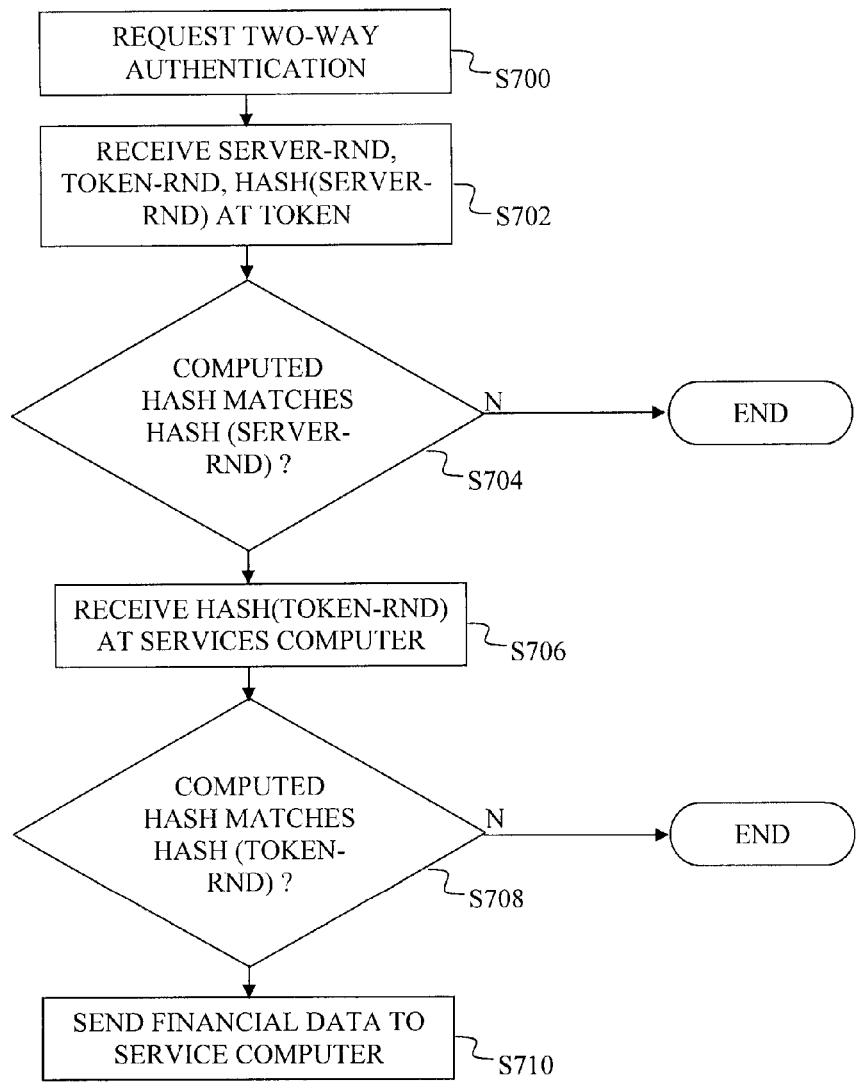
FIG. 7 is a flowchart depicting the operation of the data processing system when implementing two-way mutual authentication to validate the identity of two parties to a transaction.

Turning now to FIG. 7, to effect two-way mutual authentication between the services computer 150 and the computer host 100 the TokenInterface procedure 206.2 generates a request for two-way mutual authentication at step S700, which is transmitted to the services computer 150 via the host computer 100. At step S702, the services computer 150 generates two random numbers in response to the two-way mutual authentication request:

SERVER-RND: a random number for the services computer 150

TOKEN-RND: a random number for the hardware token 100

The services computer 150 also generates a digital signature (HASH(SERVER-RND)) by computing a one-way bash value from the SERVER-RND random number, and encrypting the hash value with the private encryption key assigned to the services computer 150. The services computer 150 then transmits SERVER-RND, TOKEN-RND and HASH (SERVER-RND) to the TokenInterface procedure 206.2. The TokenInterface procedure 206.2 transmits SERVER-RND, TOKEN-RND and HASH(SERVER-RND) to the hardware token 200.

At step S704, the hardware token 200 verifies the identity of the services computer 150. To do so, the data processor section 202 of the hardware token 200 uses one of the cryptographic procedures 216.1 and the public key assigned to the services computer 150 (stored in one of the TrustedCertificate records 220.7) to decrypt HASH(SERVER-RND). The data processor section 202 then computes a one-way hash value from the SERVER-RND random number, and compares the computed one-way hash with the hash value decrypted from HASH(SERVER-RND).

If the two hash values match, the hardware token 200 has verified the identity of the services computer 150, whereupon the data processor section 202 generates a digital signature (HASH(TOKEN-RND)) at step S706, by computing a one-way hash value from the TOKEN-RND random number, and encrypting the hash value with the private encryption key assigned to the hardware token 200. The data processor section 202 then transmits HASH(TOKEN-RND) to the TokenInterface procedure 206.2. The TokenInterface procedure 206.2 transmits HASH(TOKEN-RND) to the services computer 150.

At step S708, the services computer 150 uses the public key assigned to the hardware token 200 to decrypt HASH(TOKEN-RND). The services computer 150 then computes a one-way hash value from the TOKEN-RND random number generated at step S702, and compares the computed one-way hash with the hash value decrypted from HASH(TOKEN-RND). If the two hash values match, the services computer 150 has verified the identity of the hardware token 200. The hardware token 200 then proceeds with the transaction with the services computer 150, at step S710, by transmitting the magnetic stripe data 220.8 and/or the EMV data 220.9 to the host computer 100, via the TokenInterface procedure 206.2, for transmission to the services computer 150.

Online Transaction Using Three-Way Authentication

Figure 8:
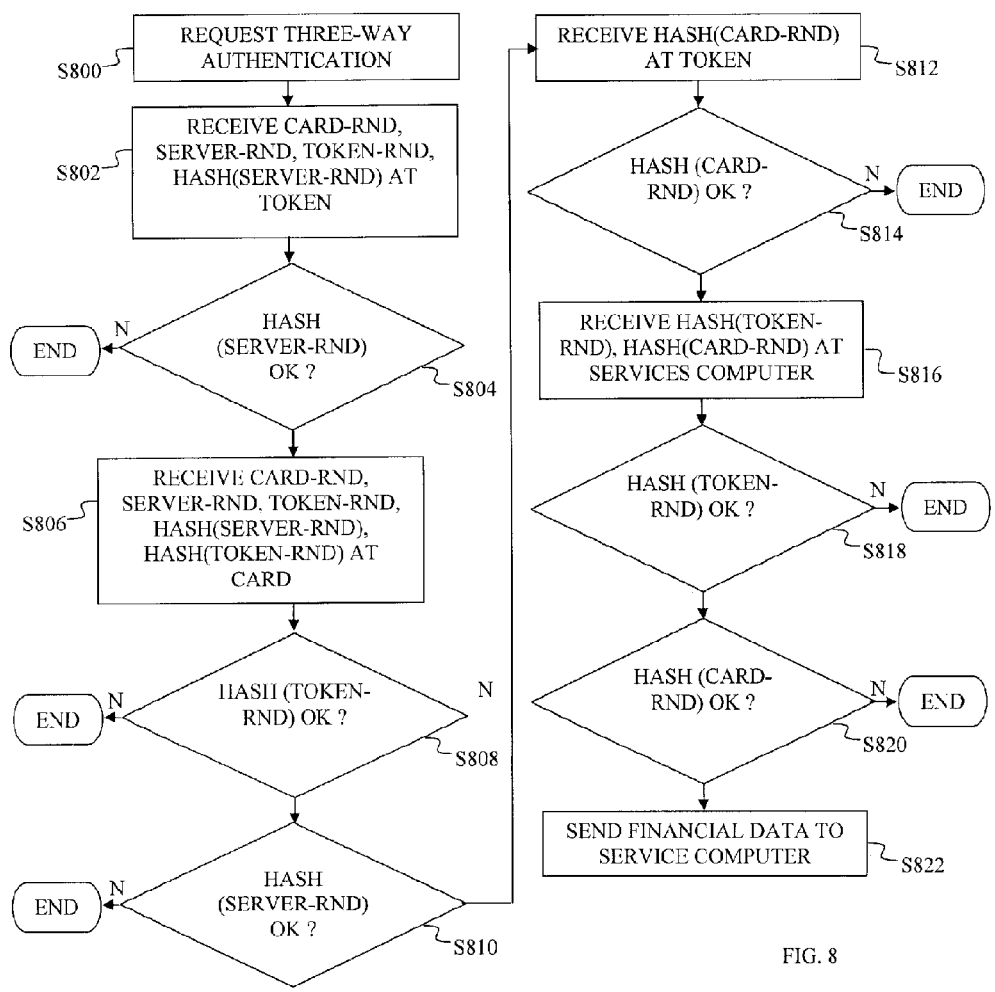
FIG. 8 is a flowchart depicting the operation of the data processing system when implementing three-way mutual authentication to validate the identity of three parties to a transaction.

Turning now to FIG. 8, to effect three-way mutual authentication between the services computer 150 and the computer host 100 the TokenInterface procedure 206.2 generates a request for three-way mutual authentication at step S800, which is transmitted to the services computer 150 via the host computer 100. At step S802, the services computer 150 generates three random numbers in response to the three-way mutual authentication request:

CARD-RND: a random number for a payment card interfaced with token 100

SERVER-RND: a random number for the services computer 150

TOKEN-RND: a random number for the hardware token 100

The payment card comprises a Smartcard-based RFID-enabled device that interfaces with the hardware token 200 via the RFID reader 208.

As above, the services computer 150 also generates a digital signature (HASH(SERVER-RND)) from the SERVER-RND random number. The services computer 150 then transmits CARD-RND, SERVER-RND, TOKEN-RND and HASH(SERVER-RND) to the TokenInterface procedure 206.2. The TokenInterface procedure 206.2 transmits CARD-RND, SERVER-RND, TOKEN-RND and HASH(SERVER-RND) to the hardware token 200.

At step S804, the hardware token 200 verifies the identity of the services computer 150. To do so, the data processor section 202 of the hardware token 200 decrypts HASH (SERVER-RND), computes a one-way hash value from the SERVER-RND random number, and compares the computed one-way hash with the hash value decrypted from HASH (SERVER-RND). If the two hash values match, the hardware token 200 has verified the identity of the services computer 150.

At step S806, the data processor section 202 generates a digital signature (HASH(TOKEN-RND)) from the TOKEN-RND random number. The data processor section 202 transmits CARD-RND, SERVER-RND, TOKEN-RND, HASH (SERVER-RND) and HASH(TOKEN-RND) to the TokenInterface procedure 206.2. The TokenInterface procedure 206.2 transmits HASH(TOKEN-RND) to the payment card via the RFID reader 208.

At step S808, the payment card verifies the identity of the hardware token 200. To do so, the payment card decrypts HASH(TOKEN-RND), computes a one-way hash value from the TOKEN-RND random number, and compares the computed one-way hash with the hash value decrypted from HASH(TOKEN-RND). If the two hash values match, the payment card has verified the identity of the hardware token 200.

At step S810, the payment card verifies the identity of the services computer 150. To do so, the payment card decrypts HASH(SERVER-RND), computes a one-way hash value from the SERVER-RND random number, and compares the computed one-way hash with the hash value decrypted from HASH(SERVER-RND). If the two hash values match, the payment card has verified the identity of the services computer 150.

At step S812, the payment card generates a digital signature (HASH(CARD-RND)) from the CARD-RND random number. The payment card transmits HASH(CARD-RND) to the hardware token 200 via the RFID reader 208.

At step 814, the hardware token 200 verifies the identity of the payment card. To do so, the hardware token 200 decrypts HASH(CARD-RND), computes a one-way hash value from the CARD-RND random number, and compares the computed one-way hash with the hash value decrypted from HASH(CARD-RND). If the two hash values match, the hardware token 200 has verified the identity of the hardware token 200.

At step S816, the hardware token 200 transmits HASH (TOKEN-RND) and HASH(CARD-RND) to the TokenInterface procedure 206.2. The TokenInterface procedure 206.2 transmits HASH(TOKEN-RND) and HASH(CARD-RND) to the services computer 150.

At step S818, the services computer 150 verifies the identity of the hardware token 200. To do so, the services computer 150 decrypts HASH(TOKEN-RND), computes a one-way hash value from the TOKEN-RND random number, and compares the computed one-way hash with the hash value decrypted from HASH(TOKEN-RND). If the two hash values match, the services computer 150 has verified the identity of the hardware token 200.

At step S820, the services computer 150 verifies the identity of the payment card. To do so, the services computer 150 decrypts HASH(CARD-RND), computes a one-way hash value from the CARD-RND random number, and compares the computed one-way hash with the hash value decrypted from HASH(CARD-RND). If the two hash values match, the services computer 150 has verified the identity of the payment card. The hardware token 200 then proceeds with the transaction with the services computer 150, at step S822, by querying the payment card for its EMV data, and then transmitting the received EMV data to the host computer 100, via the TokenInterface procedure 206.2, for transmission to the services computer 150.

The invention claimed is:

1. A method of effecting secure communication over a network, comprising:
   interfacing a hardware token with a computer host, the hardware token comprising security software and communication software stored thereon, the security software configured to determine an authenticity of the communication software stored on the hardware token, wherein the security software comprises computer-executable instructions pre-stored in a memory of the hardware token, the computer host comprising a memory distinct from the hardware token memory;
   on the hardware token, determining an authenticity of the security software that is pre-stored in the memory of the hardware token wherein the hardware token comprises a hash code stored in the hardware token memory, the hash code comprising a one-way hash of the security software, and the security software authenticity determining comprises at the hardware token computing a one-way hash of the security software and comparing the computed one-way hash against the stored hash code;
   upon successful validation of the authenticity of the security software on the hardware token, loading the security software from the hardware token memory into the computer host memory;
   the computer host executing the loaded security software from the computer host memory to determine authenticity of the communication software stored on the hardware token wherein the hardware token comprises a second hash code stored in the hardware token memory, the second hash code comprising a one-way hash of the communication software, and the communication software authenticity determining comprises at the computer host computing a one-way hash of the communication software and comparing the computed communication software hash against the second hash code; and
   after successful validation of the authenticity of the communication software using the security software, facilitating communication, via the computer host, between the hardware token and a remote computer remote from the computer host, by executing the communication software from the computer host memory.

2. The method according to claim 1, wherein the hardware token memory comprises a passcode stored thereon, and the communication software executing comprises prompting for entry of a passcode, determining a validity of the entered passcode at the hardware token by comparing the entered passcode against the stored passcode, and executing the communication software from the computer host memory after successful validation of the entered passcode and the authenticity of the communication software.

3. The method according to claim 2, wherein the computer host is configured for communication with a software update server over a network, and the communication software authenticity determining comprises downloading a reference copy of the communication software from the software server over the network to the hardware token memory upon unsuccessful validation of the authenticity of the communication software.

4. The method according to claim 1, wherein the hardware token comprises a hash code stored in the hardware token memory, the hash code comprising a one-way hash of the communication software, and the communication software authenticity determining comprises at the hardware token computing a one-way hash of the communication security software and comparing the computed one-way hash against the stored hash code.

5. The method according to claim 1, wherein the hardware token memory comprises a read-only memory and a read-write memory, the security software comprises an integrity check procedure and an application loader procedure, the integrity check procedure being stored in the read-only memory and being configured to determine the authenticity of the application loader procedure, the application loader procedure being configured to determine the authenticity of the communication software, the hardware token comprises a hash code comprising a one-way hash of the integrity check procedure, and the security software authenticity determining comprises the integrity check procedure computing a one-way hash of the loader program and effecting loading of the application loader procedure into the computer host memory after a match between the computed one-way hash and the stored hash code.

6. The method according to claim 5, wherein the hardware token comprises a second hash code comprising a one-way hash of the communication software, the communication software being stored in the read-write memory of the hardware token, and the communication software authenticity determining comprises the application loader procedure computing a one-way hash of the communication software and loading the communication software into the computer host memory after a match between the communication software hash and the second hash code.

7. The method according to claim 6, wherein the hardware token memory comprises a passcode stored thereon, and the communication software executing comprises prompting for entry of a passcode, determining a validity of the entered passcode at the hardware token by comparing the entered passcode against the stored passcode, and executing the communication software from the computer host memory after a match between the entered passcode and the stored passcode and a match between the communication software hash and the second hash code.

8. The method according to claim 1, further comprising at the hardware token verifying an identity of the remote computer by receiving a digital signature purporting to be signed by the remote computer and determining whether the received digital signature was signed by the remote computer.

9. The method according to claim 1, further comprising interfacing a Smartcard with the hardware token, and at the Smartcard verifying an identity of the remote computer and the hardware token by receiving at the Smartcard digital signatures each purporting to be signed respectively by the remote computer and the hardware token and determining whether each received respective digital signature was signed by the remote computer and the hardware token.

10. The method according to claim 1, further comprising interfacing a Smartcard with the hardware token, and at the hardware token verifying on behalf of the Smartcard an identity of the remote computer by receiving at the hardware token the digital signatures purporting to be signed by the remote computer and determining whether the received digital signature was produced by the remote computer.

11. A hardware token comprising:
an interface configured for interfacing the hardware token with a computer host; and
a memory coupled to the interface and pre-storing communication software and security software, the security software configured to determine an authenticity of the communication software stored in the memory, wherein the security software comprises computer-executable instructions pre-stored in the memory,
the hardware token configured to: determine an authenticity of the security software that is pre-stored in the memory wherein the memory stores a hash code comprising a one-way hash of the security software, and the security software is configured to determine an authenticity thereof by causing the hardware token to compute a one-way hash of the security software and compare the computed one-way hash against the stored hash code;
upon successful validation of the authenticity of the security software on the hardware token, load the security software from the hardware token memory into the computer host memory;
cause the computer host to execute the loaded security software from the computer host memory to determine authenticity of the communication software stored on the hardware token wherein the memory stores a second hash code comprising a one-way hash of the communication software, and the security software is configured to determine the authenticity of the communication software by causing the computer host to compute a one-way hash of the communication software and compare the computed communication software hash against the second hash code; and
after successful validation of the authenticity of the communication software using the security software, communicate, via the computer host executing the communication software, with a remote computer remote from the computer host.

12. The hardware token according to claim 11, wherein the memory comprises passcode stored thereon, and the security software is configured to prompt for entry of a passcode at the hardware token, determine a validity of the entered passcode at the hardware token by comparing the entered passcode against the stored passcode, and load the communication software into the computer host after successful validation of the entered passcode and the authenticity of the communication software.

13. The hardware token according to claim 12, wherein the security software is configured to cause the computer host to download a reference copy of the communication software from a software update computer to the memory upon unsuccessful validation of the authenticity of the communication software.

14. The hardware token according to claim 11, wherein the memory stores a hash code comprising a one-way hash of the communication software, and the security software is configured to determine an authenticity of the communication software by causing the hardware token to compute a one-way hash of the communication software and compare the computed one-way hash against the stored hash code.

15. The hardware token according to claim 11, wherein the memory comprises a read-only memory and a read-write memory, the security software comprises an integrity check procedure and an application loader procedure, the integrity check procedure being stored in the read-only memory and being configured to determine the authenticity of the application loader procedure, the application loader procedure being configured to determine the authenticity of the communication software, the memory comprises a hash code comprising a one-way hash of the integrity check procedure, and the integrity check procedure is configured to compute a one-way hash of the loader program and to effect loading of the application loader procedure into the computer host memory after a match between the computed one-way hash and the stored hash code.

16. The hardware token according to claim 15, wherein the memory comprises a second hash code comprising a one-way hash of the communication software, the communication software being stored in the read-write memory, and the application loader procedure is configured to compute a one-way hash of the communication software and load the communication software into the computer host memory after a match between the communication software hash and the second hash code.

17. The hardware token according to claim 11, further comprising a wireless card reader coupled to the interface and configured for communication with a RFID device.

18. The hardware token according to claim 11, wherein the interface is configured for removably interfacing the hardware token with the computer host, and the hardware token further comprises a data port coupled to the interface and configured for communication with a keyboard device.

* * * * *